US005100264A

United States Patent [19]

Chang et al.

[11] Patent Number: 5,100,264

[45] Date of Patent: Mar. 31, 1992

[54] PHOTOELECTRIC CONTROLLED GARBAGE DISPOSAL EQUIPMENT

[76] Inventors: Jack Chang, No. 6-2, Nung 5, Lane 2, He-pin Street; C. L. Hsio, 2/F, No. 39, Sec. 1, Hsing-nan Road, both of Chung-he City, Taiwan

[21] Appl. No.: 511,164

[22] Filed: Apr. 19, 1990

[51] Int. Cl.[5] .............................................. B65G 51/28

[52] U.S. Cl. .......................................... 406/19; 406/24; 406/31; 220/211

[58] Field of Search ....................... 406/10, 19, 21, 23, 406/24, 28, 29, 31, 32, 33, 34, 108, 113, 115, 117; 220/202, 203, 211; 414/404, 414

[56] References Cited

U.S. PATENT DOCUMENTS 4,084,770 4/1978 Warmann ............................ 406/19

FOREIGN PATENT DOCUMENTS 75848 4/1983 European Pat. Off. .............. 406/31

135302 4/1979 Fed. Rep. of Germany ........ 406/31

3211099 10/1983 Fed. Rep. of Germany ........ 406/31

*Primary Examiner*—Sherman Basinger

*Assistant Examiner*—Stephen P. Avila

[57] ABSTRACT

A garbage pail with electronic control for opening and closing its cover, characterized mainly in that, upon an induction of a sensor to the visible or invisible light it can control the opening and closing action of the cover of garbage pail automatically instead of manual operation in order to improve a fine living quality.

3 Claims, 6 Drawing Sheets

PHOTOELECTRIC CONTROLLED GARBAGE DISPOSAL EQUIPMENT

BACKGROUND AND SUMMARY OF THE INVENTION

The present invention is related to an improvement of a garbage pail, especially a garbage pail by means of electronic-control for opening and closing its cover, characterized mainly in that, by means of the sensory function of a sensor it can control the opening and closing action of the cover of garbage pail automatically instead of manual operation in order to improve the living quality.

It is well-known that there are two kinds of garbage pails available on the market, a covered garbage pail or an uncovered garbage pail. Although the uncovered garbage pail is very convenient for a garbage throw-in, but without the shielding of a cover, it will be a good bedding for mosquitoes and flies. In case the odoriferous garbages are pitched into, then the bad odor will be spread in the air and makes one unpleasant. As for the garbage pail with cover, it must be opened manually for a garbage throw-in. However, if the garbage pail is not often cleaned, its cover will be very dirty, as a result if the user opens the cover manually, his hands will be dirtied easily. In case a garbage pail is placed in a toilet, the user will feel awfully. In view of the said problem, the present invention is thus created.

The main object of the invention is to provide a convenient equipment, so that the user does not need to open the cover of the garbage pail manually, but by means of an electronic monitoring method to open it automatically, thus the garbage can be thrown into the garbage pail without contaminating one's hands and gives the user a pleasant living environment.

Another object of the invention is to provide a warning device. When the garbage inside a garbage pail is full, such warning device will be activated and inform the disposal personnel to get them disposed, to ensure a continuous application possibility.

A further object of the invention is to provide an emergency device, so that in case of a power failure, one can open the cover of a garbage pail through mechanical method, i.e. by means of foot treading, and throw the garbage into the garbage pail, so as to avoid being unable to use the garbage pail because of out of power supply.

DETAILED DESCRIPTION OF THE PREFERRED EMBODIMENTS

The above described and other objects, features and advantages of the invention will be more apparent from the following description quoted on the basis of the attached drawings.

Figure 1:
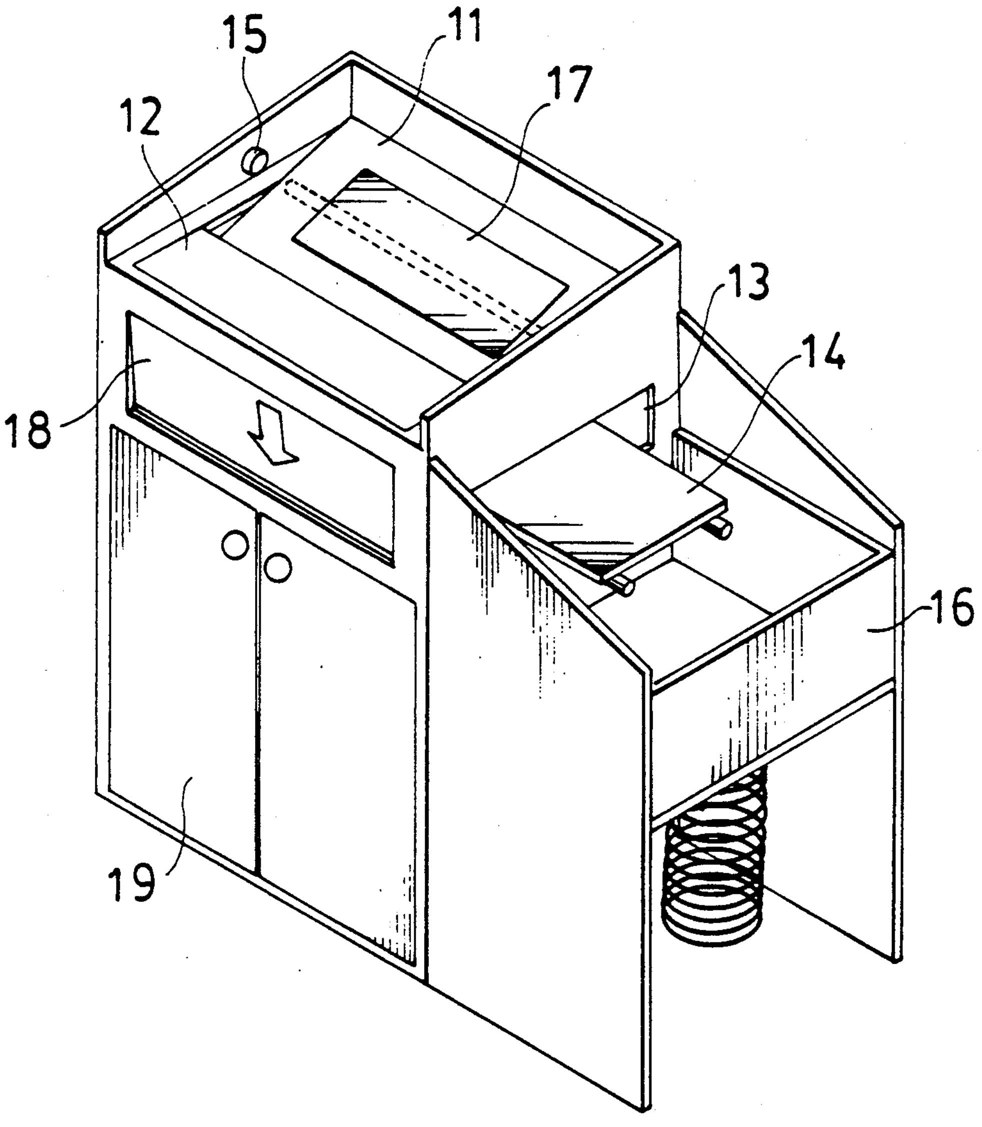
Figure 2:
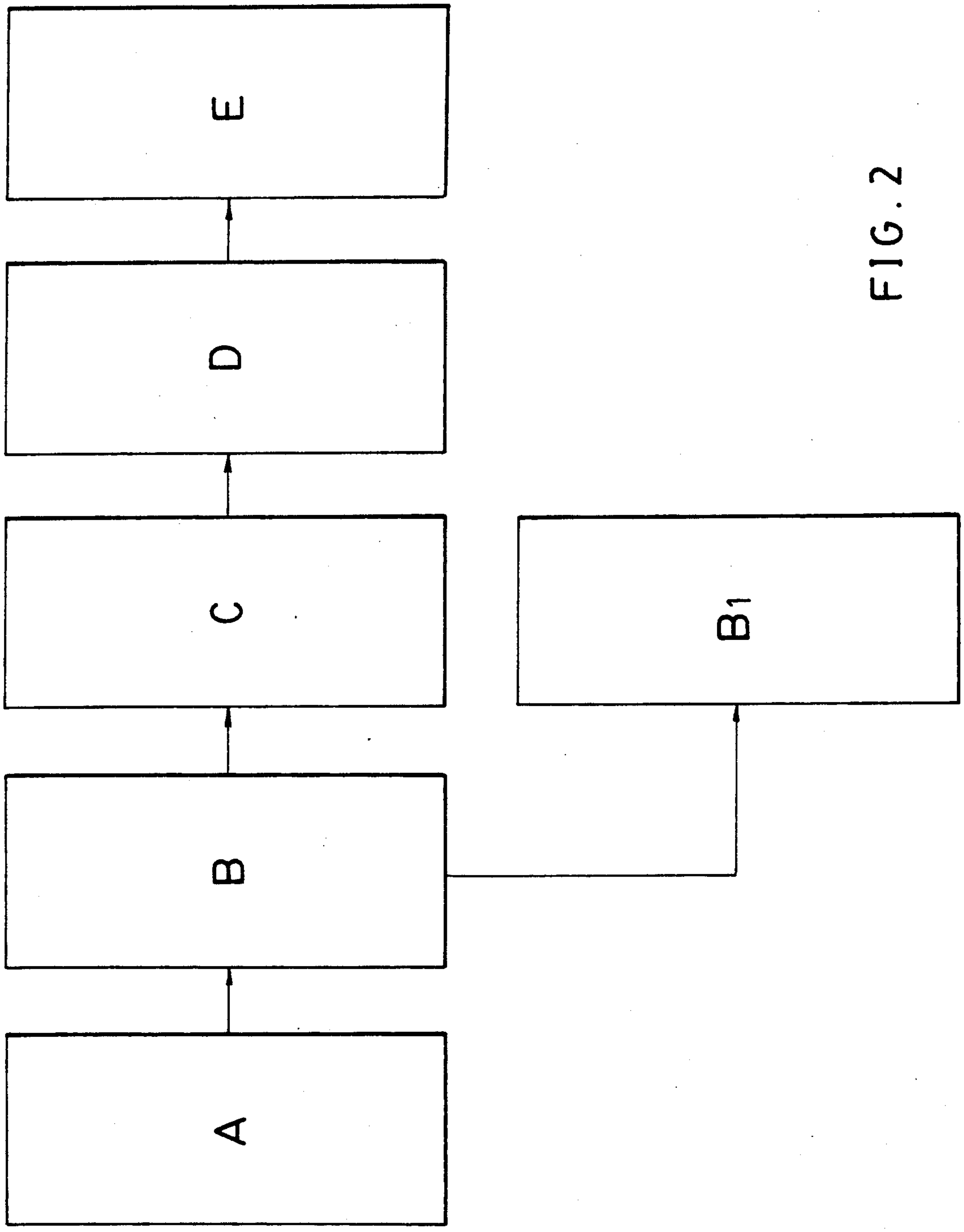
Figure 3:
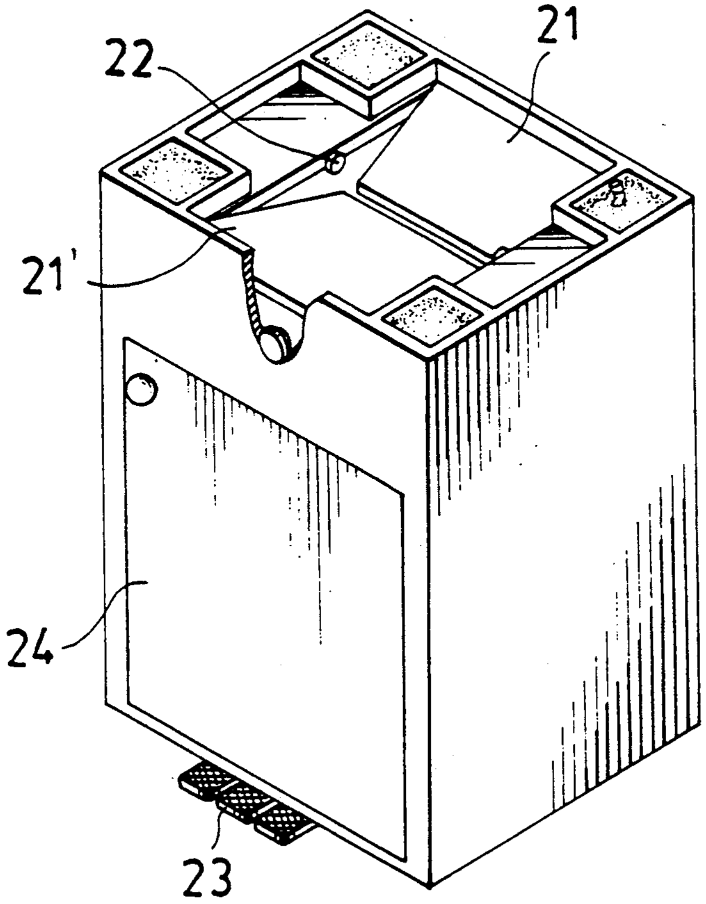
Figure 4:
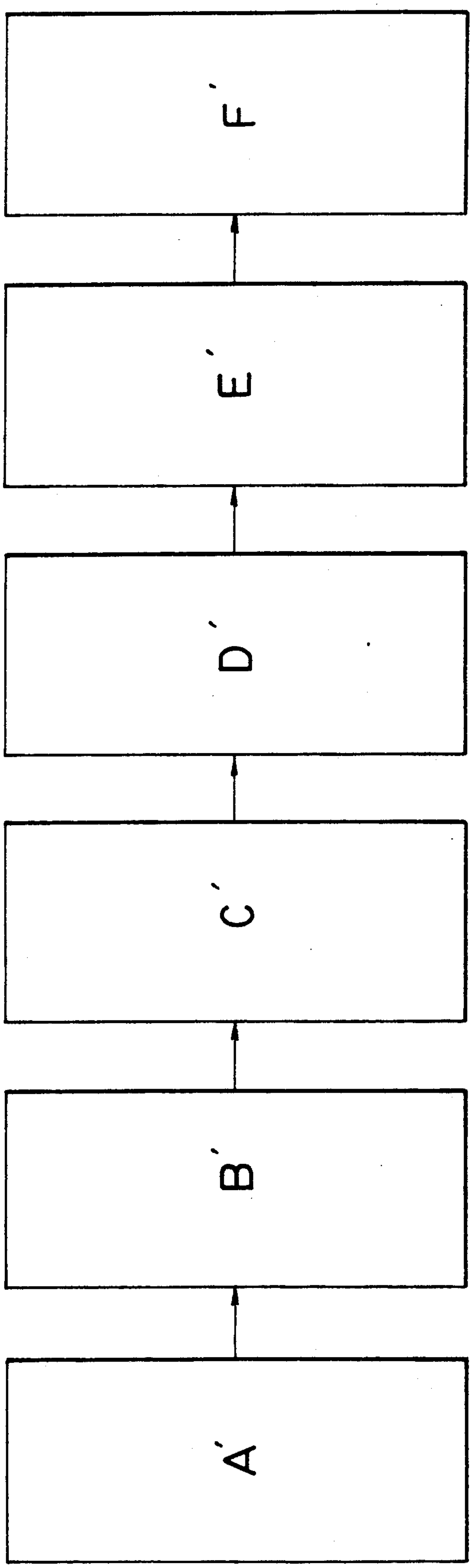
Figure 5:
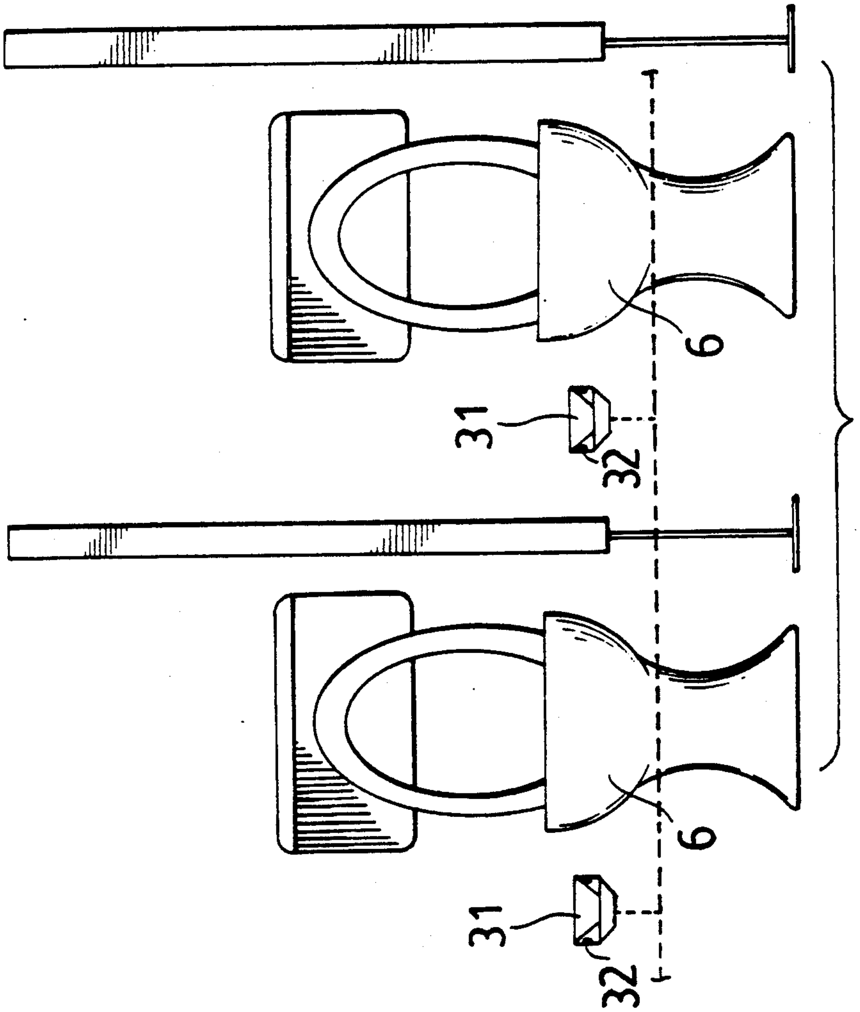
Figures 1, 2, 6:
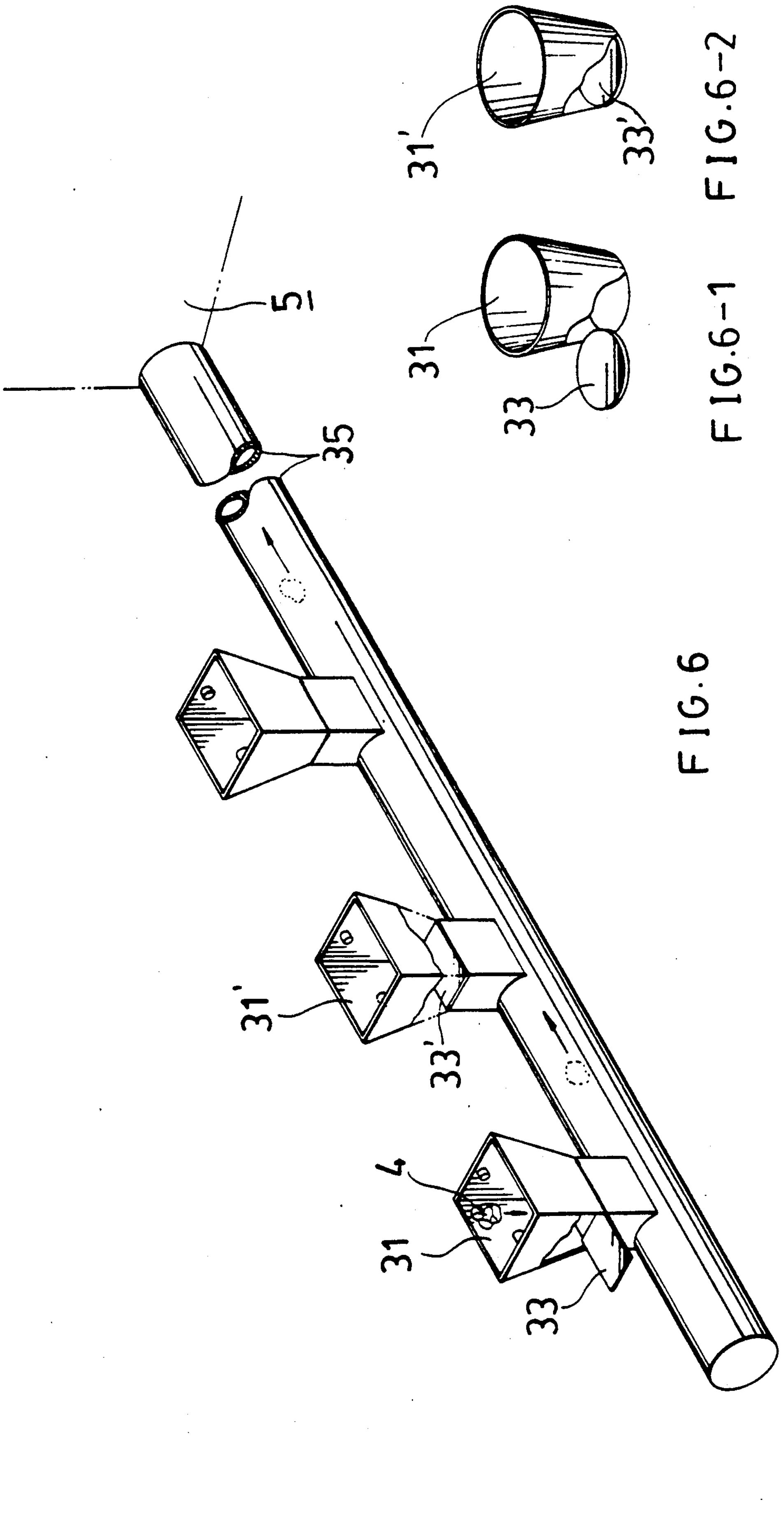

FIG. 1 an example of the preferred embodiments of the invention;

FIG. 2 a flow chart of the garbage disposal process according to FIG. 1;

FIG. 3 an another example of the preferred embodiments of the invention;

FIG. 4 a flow chart of the garbage disposal process according to FIG. 3;

FIG. 5 a pictorial view of the invention which is installed in a toilet;

FIG. 6 a pictorial view of the pipe system of the invention;

FIGS. 6-1 and 6-2 show flap details;

FIG. 7 an explosive view of a heavy-duty suction collector;

FIG. 8 a sectional view showing the combination part of the said collecting device.

Referring to FIG. 1, this preferred embodiment of the invention is suitable for garbage dumping by a fast food service store, it comprises one turn-over main door (11), one automatic opening auxiliary door (12), a flap (13) for displacement of dishes, a guiding slot (14) for automatic slide-out of dishes, an automatic sensor (15), a rack (16) for dishes, two magnets (17) (17') (17' on reverse, not illustrated), a side door (18) which will be used in case of out of power supply, and a garbage disposal door (19). The operation procedure will be:

After meal, the customer puts the dish plate on the main door (11), the automatic sensor (15) receives the monitored signal and activates the magnet (17) producing a magnetic attraction to adhere the dish plate on the main door (11), then the main door (11) and the auxiliary door (12) will be opened downwards and dumps the garbage in the dish plate into the garbage pail. After about 3 seconds, the dish plate will be automatically drawn out from the guiding slot (14) and protruded at the bottom of the main door (11). Then the force of the magnet (17) of the main door (11) will be released, at this moment the dish plate will be dropped on the guiding slot (14) and slided out through the flap (13) and fallen on the dish plate rack (16). Its whole flow chart is shown in FIG. 2.

As shown in FIG. 2, the letters A–E respectively indicate the following sequences:

- A: Stand-by state,
- B: Put down the dish plate, the sensor receives the induction signal and activates the magnet to adhere the dish plate,
- B1: Another side of the main door turns over and become a stand-by state,
- C: Main door and auxiliary door turns and dumps the garbage, then activates the dish plate to slide out the guide slot automatically to a fixed place,
- D: The magnet releases its force and the dish plate drops on the guide slot automatically,
- E: The dish plate slides out of the guide slot automatically over a flap and on a dish plate rack.

Referring to FIG. 3, an another example of the preferred embodiments of the invention, it will be a normal garbage pail suitable for household and office application, comprises two main doors (21) (21'), a sensor (22), a mechanical operated treadle (23) and a garbage disposal door (24). The operation procedure will be:

While throw away the garbage, put it on the slot formed by the two main doors (21) (21'), the sensor (22) will receive the monitored signal and produce a positive voltage to activate the motor (not illustrated) to rotate in positive direction and makes the main doors (21) (21') opened downwards and let the garbage drop into a garbage pail. When the main door (21) is opening up to the dead point, it will activate a switch (25) to produce a negative voltage to activate the motor to rotate in negative direction and makes the main doors (21) (21') to turn back to their original ready to close stand-by state. Its whole flow chart is shown in FIG. 4.

As shown in FIG. 4, the letters A'–F' indicate:

- A': Stand-by State,
- B': Sensor receives the induction signals and activates the electronic circuit to produce positive voltage, C': Drives the motor in positive direction and activate the main door, D': Main door activates the reversing switch on the pipe wall and makes the electronic circuit to be the negative voltage, E': Drives the motor to rotate in reverse direction and activates the main door to be closed, F': become in stand-by state.

Referring to FIG. 5, a pictorial view of the invention which is installed in a toilet, one can clearly see that a garbage inlet (31) of the present invention is respectively provided at the proper location of each flush toilet (6) and at the said inlet (31) is provided with a photoelectric controlled sensor (32). After a garbage throw-in, it will be monitored by the sensor and gives signal to open the flap (33) (please also refer to FIG. 6) and activate the heavy-duty motor provided with a suction collector, so that the garbage can be collected in an internal pipe of the said powerful collector. (Please also refer to FIG. 7).

Referring to FIG. 6, a pictorial view of the pipe system of the invention, in this drawing only three garbage inlets (31) are illustrated for instance, of course, the quantity of such inlets may be increased if required. At the pipe end is connected to a powerful suction collector (5). The first inlet (31) among the three garbage inlets (31) shows the opening state of the flap (33) after receipt of signal, while the flap (33') of another inlet (31') shows in a closing state. Of course, the design of flap may be of same construction as illustrated in FIG. 6-1. 6-1 is under the opening state, while 6-2 is under the closing state.

FIG. 7 is an explosive view of a heavy-duty suction collector. FIG. 8 is a sectional view showing the combination part of the said collecting device. Referring to FIG. 7, the powerful suction collector comprises respectively of nonwoven screening can (51), thick rough fabric screening can (52) and stainless fine mesh screening can (53) and are socket jointed in the hollow cylinder (55) at the front end of the motor (54) and the front casing (57) is engaged with the nonwoven screening can and the front casing flange (571) is connected to the pipe end of the pipe (35). The purpose for using nonwoven (51) and jute fabric (52) on the said device is to prevent from overloading of garbage or dirt overflowing to ensure that the dirt can still be absorbed to avoid penetration into the internal casing of the motor. The garbage (4) is collected in the internal pipe (55) and its powerful suction force comes from all directions as indicated by the arrows. It is worthy for mention that the force in directions as indicated by the arrows (7) penetrates the garbage (4) and at the same time gives compressed force to the garbage and makes the loose garbage gradually becomes compact form and is favorable for the treatment by the environmental personnel. Besides, a full-load warning device is provided inside the pipe (55) to give advance notice to the operator to replace the garbage bag.

After several tests we have experienced that the suction magnitude of a motor may be adjusted subject to the quantity of garbage inlets and the length of the pipe. Besides, the flap at the inlet neck is often kept closed, therefore, the suction force may be used on a garbage inlet which is really required.

We claim:

1. A garbage disposal equipment comprising:

a garbage pail having a turn-over main door pivotally formed on an upper portion of said pail;

a photoelectric controlled sensor formed on an upper portion of said pail adjacent to said main door operatively monitoring anyone signal of a garbage thrown into the pail through the main door; and two magnets respectively formed on an upper surface and a bottom surface of said main door, each said magnet operatively attracting a dish plate stored with garbage thereon when actuated by said sensor, whereby upon a placing of a dish plate stored with garbage thereon on said main door, said sensor will be actuated to make one said magnet formed on the upper surface of said main door to attract said dish plate in a pre-determined period which dish plate will then be turned over gravitationally to dump the garbage downwardly into said garbage pail, and the other said magnet formed on the bottom surface will be turned upwardly ready for next disposal service.

2. A garbage disposal equipment according to claim 1, wherein said garbage pail comprises:

a dish plate relocation mechanism including a flap formed on a side portion of said pail for discharging the dish plate released from said main door when not attracted by said magnet, a guiding slot adjacent to said flap for sliding the dish plate outwardly from said flap, and a rack formed under said guiding slot for collecting the dish plate slid from said guiding slot.

3. A garbage disposal equipment comprising:

a pipe having a plurality of garbage inlets formed in said pipe each said garbage inlet provided with a photoelectric controlled sensor thereon for sensing any garbage thrown into said pipe through each said garbage inlet; and an exhaust ventilator communicated with said pipe, and operatively driven by a motor for sucking garbage in said pipe into a hollow part connected at an end portion of said pipe when actuated by said sensor by sensing a thrown garbage into the pipe;

said hollow part connected between said pipe and said exhaust ventilator provided with a plurality of screening cans having good water absorption and a stainless steel screening can for filtering off any dirt and water for preventing their entrance into the motor.

* * * * *